United States Patent [19]

Simon et al.

[11] Patent Number: 5,634,039

[45] Date of Patent: May 27, 1997

[54] METHOD AND MANAGEMENT SYSTEM FOR CONTROLLING, MONITORING AND REGULATING COMPLEX INDUSTRIAL PROCESSES IN PARTICULAR, SUCH AS IN A NUCLEAR POWER PLANT

[75] Inventors: Lothar Simon, Wagenseilstr. 12, D-90482 Nürnberg; Jochen Erdmann, Oberasbach, both of Germany

[73] Assignees: Siemens Aktiengesellschaft, Munich; Lothar Simon, Nurernberg, both of Germany

[21] Appl. No.: 381,736

[22] Filed: Feb. 1, 1995

Related U.S. Application Data

[63] Continuation of PCT/EP93/02057, Aug. 2, 1993.

[30] Foreign Application Priority Data

Aug. 1, 1992 [DE] Germany ............... 42 25 469.8
Dec. 1, 1992 [DE] Germany ............... 42 40 242.5

[51] Int. Cl.$^6$ ............... G06F 17/00; G05B 19/00
[52] U.S. Cl. ............... 395/500; 395/88; 395/907; 395/915; 364/492; 364/146
[58] Field of Search ............... 364/550, 551.01, 364/571.03, 423, 146, 150, 188, 492; 395/80, 85, 86, 88, 93, 906, 907, 914, 915, 500

[56] References Cited

U.S. PATENT DOCUMENTS

| Re. 33,162 | 2/1990 | Yoshida et al. | 364/492 |
|---|---|---|---|
| 4,330,367 | 5/1982 | Musick | 376/245 |
| 4,552,718 | 11/1985 | Impink, Jr. et al. | 376/216 |
| 4,815,014 | 3/1989 | Lipner et al. | 364/550 |
| 4,837,734 | 6/1989 | Ichikawa et al. | 364/513 |
| 5,086,400 | 2/1992 | Hayati et al. | 395/95 |
| 5,195,029 | 3/1993 | Murai et al. | 364/184 |
| 5,265,222 | 11/1993 | Nishiya et al. | 395/3 |
| 5,305,230 | 4/1994 | Matsumoto et al. | 364/495 |
| 5,315,502 | 5/1994 | Koyama et al. | 364/184 |

FOREIGN PATENT DOCUMENTS

| 0280553 | 8/1988 | European Pat. Off. . |
|---|---|---|
| 0377736 | 7/1990 | European Pat. Off. . |
| 0401816 | 12/1990 | European Pat. Off. . |
| 4134811 | 4/1993 | Germany . |
| 4133636 | 4/1993 | Germany . |
| 1656557 | 6/1991 | U.S.S.R. . |
| 1732345 | 5/1992 | U.S.S.R. . |
| 89/03092 | 4/1989 | WIPO . |
| 90/15391 | 12/1990 | WIPO . |

OTHER PUBLICATIONS

Siemens Review Publication XLI (1974) No. 6 (Friedrich et al.), pp. 260–264, "Structure and Function of the Readat program system for process computers". Jun. 1974.

*Primary Examiner*—Kevin J. Teska
*Assistant Examiner*—Tan Q. Nguyen
*Attorney, Agent, or Firm*—Herbert L. Lerner; Laurence A. Greenberg

[57] ABSTRACT

A method is provided for controlling, monitoring and regulating processes in industrial plants, especially complex industrial processes, such as plant management in failure mode situations in a nuclear power plant. Robots provided as a computation program and human operators interact with sensors and actuators being coupled to a process and procuring process information or influencing the process. Information is collected about how the values of the process parameters are developed and what actions are triggered by the robots and the human operators in a log, by recording both a history of plant performance and an action history in the log. A set of specifications of activities is supplied which indicate what actions in what types of situations can be triggered, for referring the types both to the process history and the action history, and each of which contain one set of references to information on executing the actions being directed to the robots or the human operators. The types of situations are compared with a current situation indicated by the applicable log, it is ascertained whether or not the given situation corresponds to a type, and action possibilities are derived therefrom, in a comparison unit. A management system with a display device, for controlling, monitoring and regulating processes in industrial plants, has at least one digital computer with a computation program forming robots.

25 Claims, 8 Drawing Sheets

```
┌─────────────────────────────────────────────────┐
│ SAFEGUARD: SUBCRITICALITY                       │
├─────────────────────────────────────────────────┤
│ SHORT-TERM:                                     │
│                                                 │
│ -NEUTRON FLUX < 1% APPROXIMATELY 5 MIN AFTER SCRAM │
│ -SPEED OF FLUX CHANGE ≤ 0                       │
│ LONG-TERM:                                      │
│                                                 │
│ -AT LEAST 60 CONTROL ELEMENT HAVE FAILED        │
│ -BORON CONCENTRATION,                           │
│ -NO LATER THAN 12h AFTER SCRAM: > Cr            │
│ -NO LATER THAN 30h AFTER SCRAM: > Ch            │
│ -AT COOLANT TEMPERATURE < 275°C: > Ch           │
│ -AT COOLANT TEMPERATURE < 200°C: > Ch-k         │
├─────────────────────────────────────────────────┤
│ THROW IN CONTROL ELEMENTS                       │
│ RAISE COOLANT TEMPERATURE                       │
│ STOP/PREVENT DEBORIDING                         │
│ FEED BORON INTO THE PRIMARY SYSTEM              │
└─────────────────────────────────────────────────┘
```

FIG.3

| EVENT | |
|---|---|
| NOTATION TIME | 27.7.92, 14:35:12 |
| TIME PERIOD OF OCCURRENCE | [27.7.92,14:34:37;27.7.92,14:35:10[ |
| AGENT | PRESSURE SENSOR 25z253x |
| ACTIVITY | EBS: MONITOR COOLANT PRESSURE |
| PHASE | RECOGNIZED |
| PARAMETER | COOLANT PRESSURE |
| VALUE | 25 BAR |
| COMMENTS | — |

FIG.4

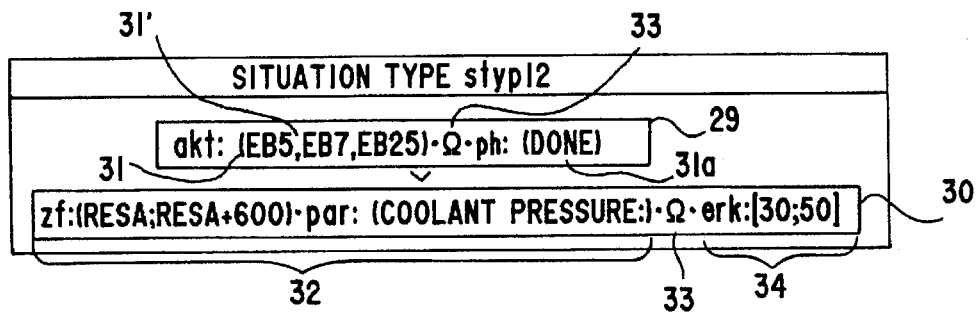
FIG.5
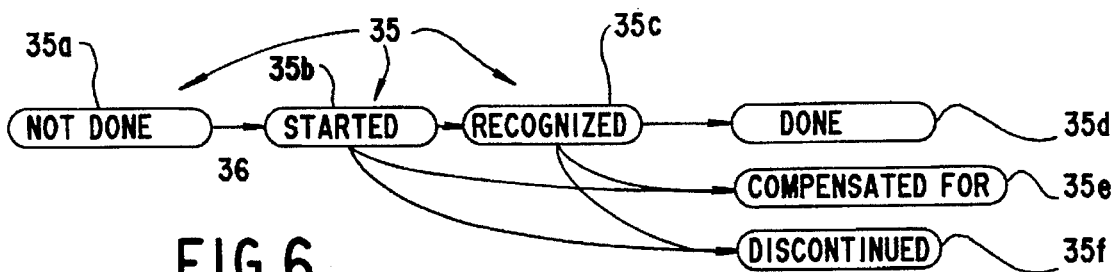
FIG.6
| ACTIVITY EB1 | |
|---|---|
| COMPLEX ACTIVITY | EB0 |
| DETAIL ACTIVITIES | (EB5,EB7,EB25) |
| PARAMETER | COOLANT PRESSURE |
| SEQUENCE DESCRIPTIONS | (styp12,styp17,styp18) |
| EXECUTION INFORMATION | GERMAN (DOCUMENT 541), ENGLISH (DOCUMENT 762)PASCAL(DOCUMENT 211) |
FIG.7

METHOD AND MANAGEMENT SYSTEM FOR CONTROLLING, MONITORING AND REGULATING COMPLEX INDUSTRIAL PROCESSES IN PARTICULAR, SUCH AS IN A NUCLEAR POWER PLANT

CROSS-REFERENCE TO RELATED APPLICATION

This application is a Continuation of International Application Ser. No. PCT/EP93/02057, filed Aug. 2, 1993.

BACKGROUND OF THE INVENTION

Field of the Invention

The invention relates to a method for controlling, monitoring and regulating processes in industrial plants, especially complex industrial processes, such as plant management in failure mode situations in a nuclear power plant, using automatic agents in the form of a digital computation program, which interact with sensors or actuators that are coupled to the process, procure process information or influence the process. The term "task" is understood below to mean the activities of the automatic agents, which are also known as robots, or of the human operators intervening in the process. The progress of execution of activities is marked by actions.

Such a method is especially significant for complex industrial processes and associated complex plants. It is of great utility, for example, in the operation of a nuclear power plant, particularly during failure mode situations, but also, for instance, during "maintenance work" (DIN 31051) in nuclear power plants, as well as during "commissioning", "service" and "repair" etc..

The invention also relates to a management system with a display device, for controlling, monitoring and regulating processes in industrial plants, especially complex industrial processes, such as plant management in failure mode situations in a nuclear power plant, using at least one digital computer having a computation program by which so-called automatic agents, that are also referred to as robots, are formed. Both at this point and below the dealings of the robots or human operators are referred to as activities and the progress of the execution of activities is marked by actions, wherein the robots interact with sensors or actuators, and the sensors or actuators are coupled to the process, procure the process information or influence the process.

In complicated industrial plants, control, monitoring and regulation are known to require highly complicated sensor and regulating technology (automatic agents or robots), which is monitored by highly skilled human experts (human operators). In particular, in such complicated tasks, precise prediction of how the status of the plant will change over time and how it will react to external interventions (activities) as a rule presents enormous difficulties. Above all, on one hand the pursuit of strategic long-term goals must be made the responsibility of human operators. On the other hand, the plant must be run largely automatically, since a human being cannot intervene in complex automatic processes precisely enough or fast enough. Moreover, the data stream in terms of the values of plant parameters is far too large to be sent, without prior automatic processing, to the human operators, who must efficiently gain insight into the current plant status and from it possibly derive and initiate activities in order to suitably influence the plant status. Moreover, almost always, such activities cannot or should not be carried out directly but rather only by means of robots.

SUMMARY OF THE INVENTION

It is accordingly an object of the invention to provide a method and a management system for controlling, monitoring and regulating complex industrial processes in particular, such as in a nuclear power plant, which overcome the hereinafore-mentioned disadvantages of the heretofore-known methods and devices of this general type and which are distinguished by close integration and coordination among automatic and human steps to be taken. Subsidiary objects to be obtained are that as many robots according to the invention as possible, both sensors and actuators (such as valves, manipulators or other actors), should report the outcomes of their activities, procure the required control programs and the like from the management system, and coordinate their activities by way of this system. Analogously, the human operators should be able to report the outcomes of their activities (if not detectable by sensors, with examples being hypotheses) to the system, procure the required information handbook information from it, and coordinate their activities with those of other human operators and/or robots. In particular, the management support for human operators, such as handbooks with the relevant information about the course of the task to be executed, should be made available not on paper but rather on computers, so that they can be compared there with the likewise arriving data about the current plant status, to ensure that the support can thus be referred to the situation.

Previous principles for solving such problems can be classified in accordance with two different basic models. The first model, which is represented by reference 1, namely Published European Application No. 0 280 553 A2, corresponding to U.S. Pat. No. 4,815,014, and reference 2, namely Published European Application No. 0 393 837 A3, uses preformulated procedures, based on extensive simulations and calculations and so forth, to support the human operators. The term "procedures" is understood in reference 1 and reference 2 to mean a chronologically fixed succession of individual activities in such a form that for each activity, one plant status is specified, which is supposed to be attained once the execution of the activity has been successfully carried out. In the procedure, both a next activity, with which the procedure if successful is to be continued and an alternative next activity in the event that the specified plant status has not been obtained, are indicated. Working through the procedures is supported by the proposed systems, in that the indicated plant statuses can be compared with the actual ones, and accordingly next activities can be offered automatically. With this method, it is relatively readily possible to present the human operators with the strategic aspects of a task in the form of ready-made procedures. The second model, which is represented by reference 3, namely Published European Application No. 0 077 080 B1, uses associations of the regulating type to furnish connections between plant statuses and respective activities that are suitable as a reaction to them. In a specific case, in reference 3, a conclusion is automatically drawn from a given plant status as to an "optimal" activity that is presented to the human operators for execution. That conclusion is drawn by way of various types of associations, such as between causes and resultant plant statuses, present and future plant statuses, plant statuses and activities, etc., in a complicated, multistep process of derivation. Through the use of that method, above all, a tactical, plant status-oriented way of handling a task can be achieved relatively well.

The greatest problem in complicated tasks is due to precisely what makes the first model of reference 1 and reference 2 so easy and intuitive for both the authors of the procedures and for human operators to use, namely the fact that a linear succession (with small side branches for error situations) is provided and can be worked through in practical use and simply, one step at a time: The preformulated procedures are based on a previously determined succession of plant statuses. If the actual succession, for whatever reasons, deviates therefrom, the system is unable to offer any more help. Indicating alternative activities in the case of error merely shifts the problem one stage farther but does not overcome it. That principle is lacking the tactical component, which above all in unexpected plant statuses or with unexpected consequences of plant statuses, would enable irregularities in working through the procedures, such as jumping to the middle of a procedure (or making a jump in the middle of a procedure) and would enable operators to resume and to continue working through a procedure at some suitable point.

The second model of reference 3 relies in turn entirely on the tactical component. As a result, while it is quite helpful in unexpected developments of the plant status, nevertheless it has enormous difficulties in providing strategical procedures. For the authors of management systems based on that latter basic model, it is a virtually insoluble problem to describe a targeted strategic global course of the task with a collection of local, heuristic associations. The reason therefor is above all that systems in accordance with the second basic model use solely the present system status (or in other words not the history of the plant performance) and in particular do not use the course of the task up until them to derive suggestions for activities to be initiated currently. Neither of the two existing basic models offers an integrated, flexible reference of the task description to the entire "situation", including the current plant status (i.e., plant history) and the status of execution of the task (i.e., action history).

Both basic models also have even more weak points in common: Not only are the activities of the robots not conducted and coordinated through the system, so that possible and suitable monitoring and control options are not even exploited, but the robots also do not receive the control problems and the like from the system, thus eliminating the option of direct intervention into the actual execution of individual activities by robots.

The reference to the plant status is made only at points between individual activities. An activity is always considered to be a closed block, which can proceed unconditionally once it has been reached. That principle is overly approximate to describe complicated tasks. Often, precisely during the execution of an activity, the transition to various phases of the execution must be controlled by making reference to the situation.

A further problem is partly in direct relationship therewith. It arises from the lack of capability of specifying the described task at various levels of detail, or in other words of describing the execution of an activity by the course of a number of more-detailed activities. Thus it is not possible for the human operators to be given detailed information, which is tailor-made for their needs, on the course of tasks to be executed in accordance with importance, qualification, and time required, etc..

Another deficiency of the existing models or their principles resides in the fixed association of responsibilities for the execution of activities between robots on one hand and human operators on the other hand. An assignment always takes place outside the system, in that only activities that are assigned to robots for execution can be overridden by so-called manual steps to be taken. The fact that human operators within the system can relieve robots of their jobs or even assign them certain activities to accomplish during the task, is not made possible by the known models.

The primary object of the invention as defined above can therefore be made more precise by saying that it is to overcome the above-described problems in models 1 and 2. With the foregoing and other objects in view there is provided, in accordance with the invention, a method for controlling, monitoring and regulating processes in industrial plants, especially complex industrial processes, such as plant management in failure mode situations in a nuclear power plant, which comprises interacting at least one of robots provided as a computation program and human operators, with sensors and actuators being coupled to a process and procuring process information or influencing the process; collecting information about how the values of the process parameters are developed and what actions are triggered by the robots and the human operators in a log, by recording both a history of plant performance and an action history in the log; supplying a set of specifications of activities: indicating what actions in what types of situations can be triggered, for referring the types both to the process history and the action history, and each containing one set of references to information on executing the actions being directed to at least one of the robots and the human operators; and comparing the types of situations with a current situation indicated by the applicable log, ascertaining if the given situation corresponds to a type, and deriving action possibilities therefrom, in a comparison unit.

With the objects of the invention in view, there is also provided a management system with a display device, for controlling, monitoring and regulating processes in industrial plants, especially complex industrial processes, such as plant management in failure mode situations in a nuclear power plant, comprising at least one digital computer having a computation program forming robots; sensors and actuators interacting with the robots, being coupled to an industrial plant process and procuring process information or influencing the process; an input/output unit for human operators; a comparison unit; a data line connected to the comparison unit; a log module having a first data memory with an input side being connected to the robot for data entry and being connected to the input/output unit for human operators, the log module having an output side connected through the data line to the comparison unit, the log module collecting information about how values of process parameters develop and what actions are triggered by the robots and the human operators and logging a history of process performance and an action history; a second data memory for sequence descriptions or situation types having an output side connected to the comparison unit, for storing a set of specifications in memory, the specifications each containing a sequence description defining what actions can be triggered in what types of situations; and the comparison unit having means for comparing the situation types from the second data memory with a current situation logged by the log module, for comparing the types with both the history of the process performance and the action history of the robots and the human operators, for permitting a determination as to whether or not the current situation matches one of the types, and for deriving action possibilities therefrom.

Both at this point and below, the term "agent" is understood to be a human operator or an automatic agent or "robot". The distinction between the human and the automatic agent is not important, or in other words, in particular, it is of equal validity for the action being triggered.

The advantages attainable with the invention are considered to be above all as follows:

1. In the description of the course of a complicated task of robots and/or human operators, the situation reference, including an arbitrary mixture of procedural (as in model 1) and associative (as in model 2) elements can now be furnished in an integrated and flexible manner.

2. Through the use of the method or also the management system according to the invention, the sequence of activities of the robots and human operators can be logged and coordinated, and for each agent (robot and/or human operator) that is to carry out an activity, suitable execution information (documents, control programs and the like) can be kept ready in a language which is understandable to that agent.

3. The situation reference can also be furnished or maintained during the execution of an activity for controlling the triggering of individual actions.

4. It is made possible to represent and work through the task course by means of repeated detailing of activities on various levels of detail.

5. A flexible allocation of jobs between the human operators and the agents is made possible.

The following specific comments on the advantages can also be made: Since the log of the execution of activities of the robots and/or human operators, on the basis of which log the course of the task is described, contains both descriptions of a previous task course (action history) and a previous development of plant parameters (plant history), and the sequence descriptions can make overall reference to this, it becomes possible to furnish an integrated and flexible situation reference. The sequence descriptions make it possible even during the execution of an activity to control the triggering of associated actions with reference to a present situation.

In accordance with another mode of the invention, there is provided a method which comprises making up the log from events being created by noting down actions; logically interlinking sets of conditions each pointing to a presence of one type of event in the log or defining such a type, by means of the situation types contained in sequence descriptions; checking for the presence of an event type described by each condition of a situation type in the log, and using the logical linkages of the conditions to automatically make statements as to the possibility of corresponding actions in the current situation predetermined by the log, with the comparison unit; and linking supplementary background information to execution information in such a way that at least one of the robots and the human operators reaches the background information while taking the execution information as a point of departure. In this way, the method is advantageously further developed with respect to the notation of an action as an event in the log, the triggering of suitable actions, and the access to the background information as a supplement to the execution information.

In accordance with a further mode of the invention, there is provided a method which comprises indicating a more-complex activity and/or a set of detail activities in the specification of an activity.

In accordance with an added mode of the invention, there is provided a method which comprises representing the information for the human operators about the action possibilities ascertained by the comparison unit in a predetermined current situation, with the aid of action diagrams that graphically describe the course of a task. These action diagrams, which can be shown quite well on a screen, are based on the recognition of relating activities and situations with one another, so as to model the task course in this way.

In accordance with an additional mode of the invention, in the preferred application of the method to process management of a power plant, in particular a nuclear power plant, there is provided a method which comprises entering the relevant on-line-available sensor data about robots into the log; and encompassing the contents of a high-quality operational handbook for the task of the robots and human operators that is demarcated by the specifications of the activities, with the memorized execution and possibly background information.

In accordance with yet another mode of the invention, in a further development of the subject matter described above, it is provided that a set of specifications for activities is provided, which represent both activities of a so-called "event-oriented" kind of procedure, in which the task sequence can be reproduced by a flow chart and is essentially supported on the action history, and also represent activities of a so-called "protection goal-oriented" kind of procedure, in which the task sequence can be reproduced by means of a table that links plants statuses and respective activities that are suitable as a reaction to them, and is supported essentially on the plant history; the sequence descriptions associated with the specifications of the activities model the "event-oriented" or "safeguard-oriented" task sequence; and the execution information associated with the specifications of the activities, or background information linked with it, in particular contain the contents of so-called "event-oriented" or "safeguard-oriented" operational handbooks for nuclear power plants and are also accessible off-line to the human operator for information search purposes.

In this way, on one hand with the procedures of an "event-oriented operational handbook", a concept of informal training of the human operator can be accomplished. The intellectual goal of this concept is the completeness of information for the execution of activities or steps to be taken, if as a prerequisite a failure mode situation can be unequivocally diagnosed. If the activities chosen based on the information of the event-oriented operational handbook are not sufficient to reach the safety goal that has been set, and in particular if so-called "safeguards", which define a safe status of the nuclear power plant itself under failure mode conditions are violated, or if safeguard-oriented activities thereby become necessary, then secondly recourse is made to the safeguard concept of the operational handbook, and activities are triggered or steps are taken that guarantee that the safeguards that have been set are adhered to. It is not until it is guaranteed that the safeguards will be adhered to that a return can be made to event-oriented failure mode "handling". Both forms of imparting knowledge represent an optimum for the complex tasks. A computer-supported operational handbook, particularly for nuclear power plants, will at this point and below be referred to as an expert book. If it is used purely as an operational handbook by way of the screen, then in comparison with conventional operational handbooks on printed paper, access to information is markedly improved (free text search, browsers, etc.). In addition, such an expert book can support a targeted information search, both by means of the action diagrams it includes and by means of formal objects, such as specifications of activities. However, the expert book can also serve as an operational handbook in on-line operation with the plant: In that case, it takes on the entire function of an on-line handbook and monitoring systems for failure modes and emergencies. Since the state of knowledge is continuously updated, particularly to provide current plant data in the expert book, the human operator is referred to the information that he or she requires for handling the failure mode in the current situation. This represents a gain in handling safety and in oversight for the operating staff.

In accordance with yet a further mode of the invention, there is provided a method which is especially suitable for flexible job allocations, according to which if a task is to be executed by a plurality of robots and/or human operators, each robot is coordinated through a data line and each of the human operators involved is coordinated through a work station (keyboard, mouse, screen or speech input and speech output devices) with the other robots and/or human operators, that is, indications about actions they trigger are entered into the common log or memorized information is called up, so that the human operators and/or robots are made mutually aware of particular action possibilities which are relevant to them.

In accordance with yet an added mode of the invention, there is provided a method which comprises making up the log with a list of events being ordered in accordance with notation times.

In accordance with yet an additional mode of the invention, there is provided a method which comprises providing each event with the following entries: a time at which the event was noted in the log; a time period during which the event took place; an agent being at least one of a human operator and a robot having triggered an action and caused the event to be noted; an activity to which the action belongs; a phase in which the execution of the activity occurred and which records the type of action; plant parameters about which the activity has optionally become aware; a value of the parameter being found by the action; and optionally comments that at least one of the human operator and the robot made for triggering the action.

In accordance with again another mode of the invention, there is provided a method which comprises defining the applicable situation type by a set of conditions being linked together inferentially, providing each of the conditions with an identification part and a qualification part, and providing each part with a set of predicates each defining one type of event.

In accordance with again a further mode of the invention, there is provided a method which comprises filtering the events corresponding to the event type out of the log by means of the comparison unit with the predicates listed in the identification part of a condition and the predicates defining a type of event; isolating the chronologically most recent of the events; and checking the isolated event along with the predicates listed in the qualification part of the condition as to whether or not it meets the thereby-defined event type, if so marking the condition as "correct", and if not marking the condition as "incorrect".

In accordance with again an added mode of the invention, there is provided a method which comprises associating an activity with the following execution phases: "not done", "begun", "recognized" and "completed" or "compensated for" or "discontinued", characterizing the situations in which the transitions can occur between the phases as follows: "not done" $\rightarrow$ begun, detected $\rightarrow$ completed and begun or detected $\rightarrow$ discontinued, by situation types, and appending the situation types being bundled into a sequence description, to a specification of the activity.

In accordance with again an additional mode of the invention, there is provided a method which comprises entering the actions at transitions between the execution phases into the log and entering a "recognized" event into the log with a description of the current status of the current value of a plant parameter as obtained by means of the activity.

The further developments of the management system relate to the structure and function of data memories, by means of which the system is advantageously expanded.

In accordance with another feature of the invention, there is provided a third data memory, communicating with the robots and the input unit for the human operators, which contains a set of information for the execution of activities, so-called execution information, which can be selected by the human operators and robots through references and can be shown on viewing devices of the display device for the human operators or is available through a data line for the robots.

In accordance with a further feature of the invention, there is provided a fourth data memory for activities to be executed as a function of the situation, which suitably communicates with or is integrated with the second data memory for sequence descriptions or situation types.

In accordance with an added feature of the invention, there is provided a data memory having explanatory information, the fourth data memory having an "activities" content including specifications of "activities", as well as "partial objects", "device objects" and "material objects", wherein the "partial objects" represent formal specifications of parts of the plant, the "device objects" represent formal specifications of devices required for executing activities, and the "material objects" represent formal specifications of materials to be used during the execution of activities, being coupled with the explanatory information in the data memory.

In accordance with an additional feature of the invention, there is provided a fifth data memory for supplementary information, which communicates with or is integrated with the third data memory for the execution information.

In accordance with a concomitant feature of the invention, there is provided a sixth data memory for action possibilities, which communicates with or is integrated with the comparison unit through an output data line of the unit, the action possibilities contemplated for the human operators and robots can be shown on a screen or called up through a data line. In order to provide oversight over the entire process (situation, previous events, activities carried out and to be carried out), an action diagram according to the invention is especially suitable, as was already noted.

Other features which are considered as characteristic for the invention are set forth in the appended claims.

Although the invention is illustrated and described herein as embodied in a method and a management system for controlling, monitoring and regulating complex industrial processes in particular, such as in a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagram in table form for a safeguard-oriented kind of procedure for handling a failure mode by recommended manual steps for the human operators;

FIG. 4 is a diagram which can appear on a screen to characterize an event and which shows various elements of the event, wherein a log includes sets of such events, and predetermined conditions in situation types of sequence descriptions check the log for the presence of certain types of events;

FIG. 5 is a further diagram which shows elements from which a situation type can be made up by way of example, wherein this situation type connects predetermined conditions with logical operators, which in the present case is an OR operator;

FIG. 6 is a diagram showing execution phases in which activities may be located, along with possible transitions between these execution phases (phase transitions);

FIG. 7 is a further diagram showing the makeup of specifications of an activity with individual activity elements;

DESCRIPTION OF THE PREFERRED EMBODIMENTS

Figure 1:
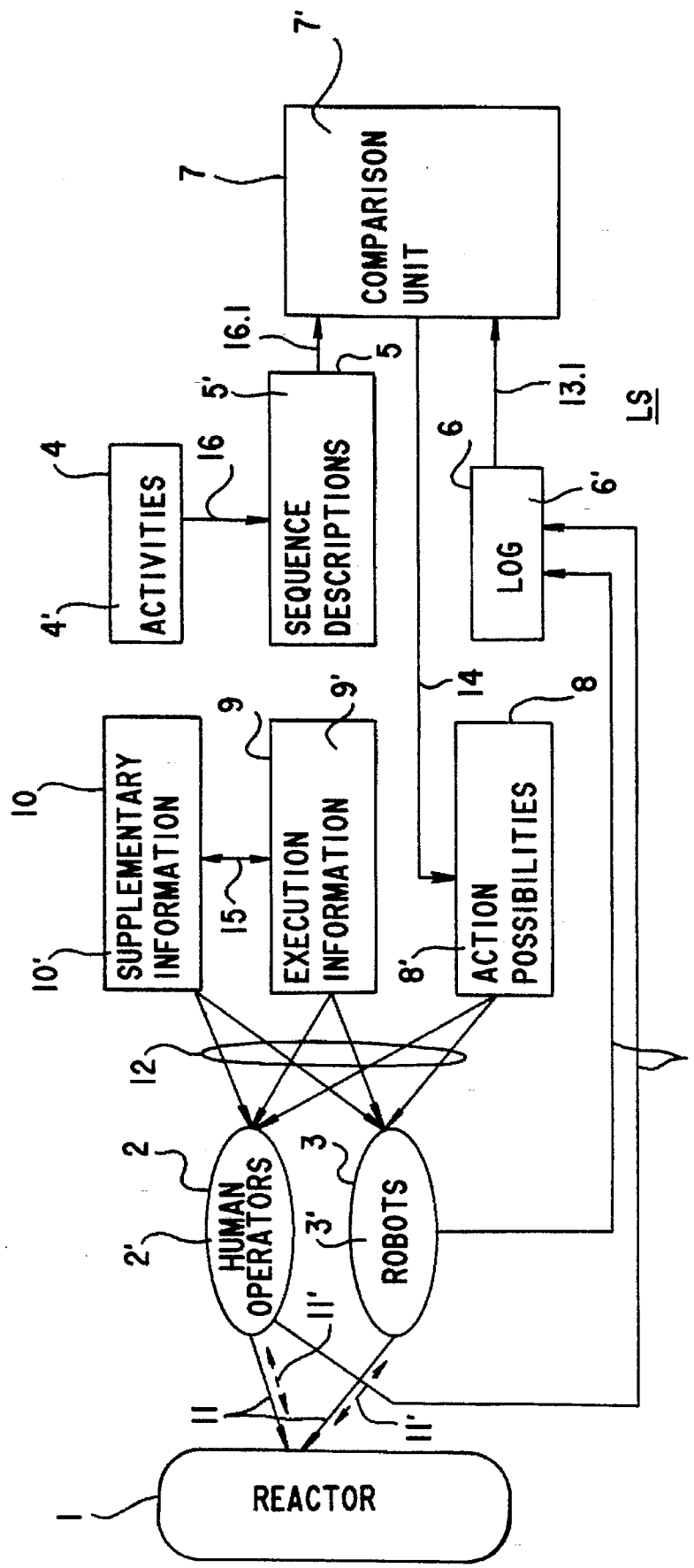
FIG. 1 is a block diagram of a nuclear power plant management system according to the invention, with which the method can be performed.

Referring now in detail to the figures of the drawing, in which an exemplary embodiment of both a management system and an associated method for controlling, monitoring and regulating processes in industrial plants is shown, and first, particularly, to FIG. 1 thereof, there is seen a management system according to the invention which will first be explained and which serves to control, monitor and regulate processes, in particular complex industrial processes, in industrial plants. In the case shown, it involves both controlling and monitoring as well as regulating a nuclear power plant, especially after or during a failure mode. The nuclear power plant is symbolically represented by a nuclear reactor 1, which is referred to as a reactor for short. In the case of management system LS which are schematically shown in FIG. 1, there is a characteristic use of at least one digital computer, having a computation program by which so-called automatic agents, also referred to as robots 3, are formed. Data content or dealings which are linked with the robots 3 is indicated by reference numeral 3'. In addition to the robots, human operators 2' also act directly or indirectly on the reactor 1. Reference numeral 2' also encompasses the activities of these human operators (switchings or other commands, etc.), and reference numeral 2 generally designates input/output units, or in other words a control keyboard or visual information (data viewing devices) for the human operators.

Viewing devices with screens for the human operators are therefore not shown separately. However, it is understood that they are present in the control room. In the following discussion, the dealings 3' of the robots 3 and the human operators 2' are referred to as activities, and the progress of the execution of activities is marked by the computation program of the digital computer by means of actions, which will be discussed in further detail below. The robots or "automatic agents" interact with non-illustrated sensors for detecting measurement values or with actuators. The latter may be valves or electric switches, for example, or manipulators or other actors (which are also not shown for the sake of simplicity). The sensors or actuators, or in other words the robots or automatic agents, are coupled to the process that is to be controlled, monitored and regulated by the management system LS. They procure process information or influence the process.

An overview of function blocks shown in FIG. 1 and data lines will be provided first.

The following reference numerals have the following meanings:

Reference numeral 4 represents a data memory for activities, and reference numeral 4' represents its data contents;

reference numeral 5 represents a data memory for sequence descriptions, and reference numeral 5' represents its data contents;

reference numeral 6 represents a log module, and reference numeral 6' represents its data contents, or the currently plotted log of events, or in other words the relevant events that take place during the process of the reactor 1;

reference numeral 7 represents a comparison unit, and reference numeral 7' represents it data contents;

reference numeral 8 represents a data memory for action possibilities proposed by the comparison unit 7, and reference numeral 8' represents its data contents;

reference numeral 9 represents a data memory for execution information, and reference numeral 9' represents its data contents;

reference numeral 10 represents a data memory for supplementary information, which is in dialog communication with the data memory 9 through a bidirectional signal line 15, and reference numeral 10' represents its data contents;

reference numeral 11 represents signal lines, which symbolize the effect of the human operators 2' through their input unit 2 and of the robots 3 on the reactor 1;

reference numeral 11' indicates dashed double-headed arrows which represent activities of the elements 3 and 2';

reference numeral 12 represents linking signal lines between the data memories 8, 9 and 10 on one hand and the robots 3 or the input and output units 2 for the human operators 2' on the other hand, with the data link being represented by a slender, vertically oriented ellipse;

reference numeral 13 represents signal and data lines between the input and output units 3 for the human operators 2' and the robots 3, on one hand, and the log module 6 on the other hand;

reference numeral 13.1 represents an output data line from the log 6 to the comparison unit 7;

reference numeral 14 represents a data line from the comparison unit 7 to the data memory 8 for action possibilities;

reference numeral 15, mentioned above, represents a dialog or bidirectional data line between the data memories 9 and 10;

reference numeral 16 represents a data line from the data memory 4 for activities to the data memory 5 for sequence descriptions; and reference numeral 16.1 represents a data line from the data memory 5 to the comparison unit 7.

The interplay among the aforementioned function blocks and units can now be described: For data input, a first data memory which is part of the log module 6 is connected on the input side to the robots 3 and to the input and output unit 2 for the human operators 2'. It is connected on the output side through the data line 13.1 with the comparison unit 7. The log module 6 is provided for collecting information as to how the values of the parameters are developing and what actions are triggered by the robots 3 and the human operators 2'. In other words, it logs in the operations of the reactor 1 and the history of the actions of the robots and the human operators. In the second data memory 5 for sequence descriptions, which is likewise connected on the output side with the comparison unit 7, a set of specifications of activities can be stored in memory. The specifications 5' (in other words the data contents) each contain one sequence description. Through the use of this sequence description, it is possible to define what actions in what types of situations (situation types) can be triggered when the respective activity is executed.

The comparison unit 7 is provided with means for comparing the situation types from the data memory 5 with the current situation logged by the log module 6, so that the situation types can be compared to both the plant history and the action history of the current situation, and it is thus possible to ascertain whether or not the current situation matches one of the situation types, and action possibilities can be derived therefrom.

The third data memory 9, which communicates with the robots 3 and the input/output unit 2 for the human operators 2', contains a set of information for executing activities, which is so-called execution information. The activities can be selected by the human operators 2' and the robots 3 through references and can be shown on viewing devices of the non-illustrated display device for the human operators or can be made available over a data line for the robots 3. The fourth data memory 4 for the activities 4' to be executed as a function of the situation is integrated with the second data memory 5 for sequence descriptions or situation types, or is connected to that data memory over the data line 16.

The fifth data memory 10 for supplementary information is connected to the third data memory 9 for the execution information over the bidirectional data line 15, or it is integrated with that data memory 9.

Finally, the sixth data memory 8 for action possibilities is connected to the comparison unit 7 through the output data line 14 of that unit (or is integrated with the comparison unit 7). The action possibilities intended for the human operators 2' and the robots 3 can be suitably shown on a screen or called up over a data line.

Figure 2:
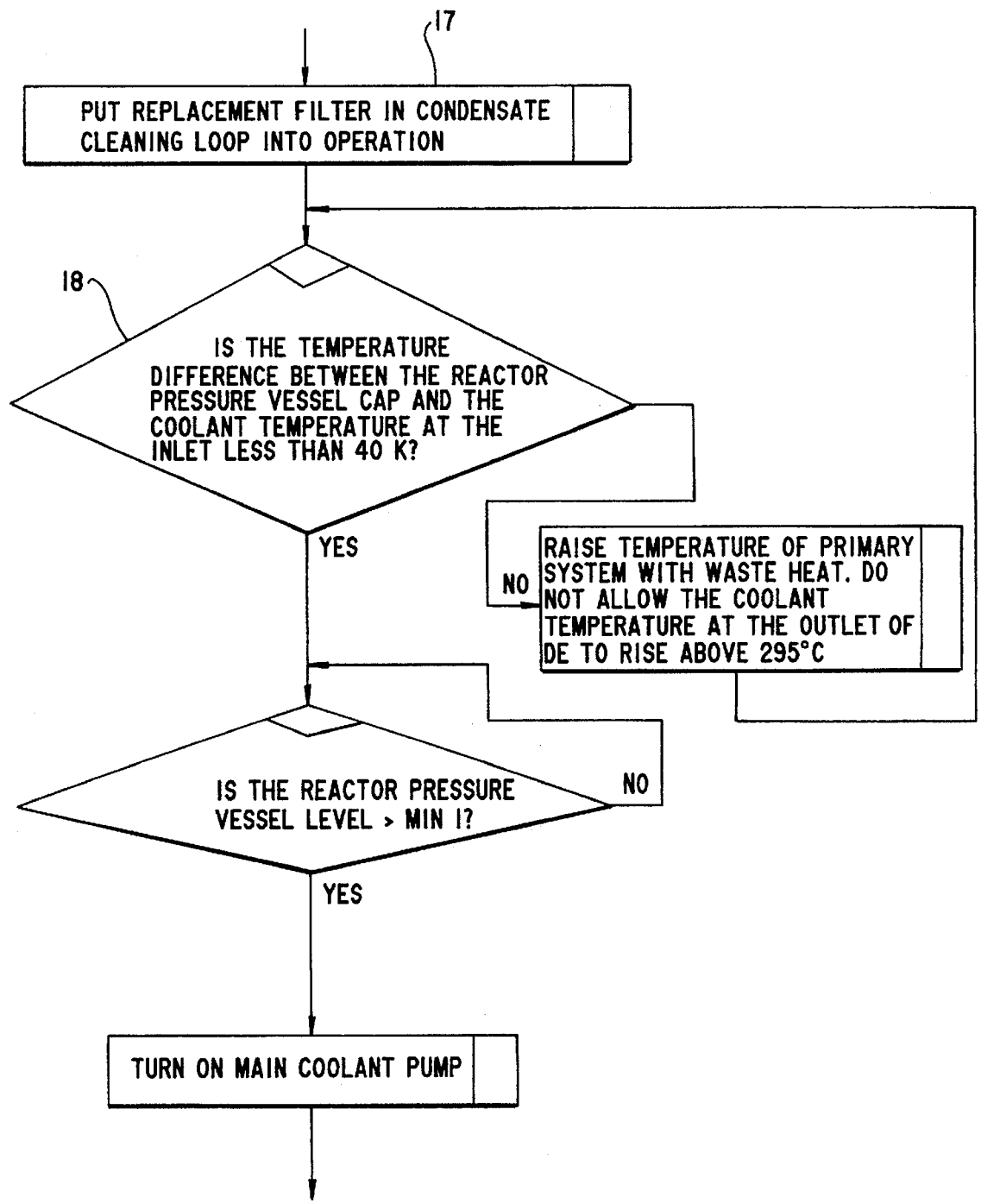
FIG. 2 is a portion of a flow chart for an event-oriented kind of procedure for handling a failure mode based on recommended manual steps for human operators.

For the sake of a better understanding of the invention, a description will first be provided for the reproduction of an event-oriented kind of procedure in FIG. 2 and of a safeguard-oriented kind of procedure in FIG. 3, for gaining control over failure modes in nuclear power plants, as is found in the state of the art of the present applicant and as is contained in this form in so-called operational handbooks. Thus, event-oriented activities of the human operators for which preformulated procedures are often used will be described with reference to FIG. 2. These procedures include activities 17, such as "put replacement filter in condensate cleaning loop into operation", and questions 18, such as "Is the temperature difference between the reactor pressure vessel cap and the coolant temperature at the inlet <40 K?". The diamond that follows contains a further question, "Is the reactor pressure vessel level >min 1?". If the answer to this question is no, then a loop of the diagram returns to the main path. If the answer is yes, the main path leads to a new activity, namely "Turn on main coolant pump". A further activity is connected through a crosswise arrow to the question 18 and returned to the main path through a loop. The content of this activity block is self-explanatory.

In the case of the safeguard-oriented kind of procedure, tables that associate types of situations 19 and activities 20 which are suitable reactions in these situations (see FIG. 3) show the preferred description means. Symbols Cr, Ch, Ch-K in FIG. 3 stand for limit boron concentrations. Otherwise, the contents of the table of FIG. 3 are self-explanatory. In contrast to the flow chart of FIG. 2, there is not as much of a chronological and logical succession between the categories 19 and 20 as a difference because of the description means being used. Once a failure mode occurs, automatic activities triggered by the plant status start up. They serve to keep the reactor in a safe status until such time as the human operators intervene with suitable activities and convert the plant into a long-term safe status (in other words, subcritical, cold). After automatic activities, which are monitored for their correct function by the human operators, have proceeded for some time, the human operators also take action with activities, one step at a time. Two kinds of procedures, as already mentioned, are available to them for that purpose. The prerequisite for the event-oriented procedure is a reliable diagnosis of the class, with which diagnosis the failure mode that has occurred can be associated. In that case, pre-prepared procedures can be employed by the human operators, in accordance with the flow chart of FIG. 2, in order to convert the plant into a long-term safe status. During the entire time while activities for failure mode handling occur, the human operators must keep especially important plant parameters within predetermined ranges. Criteria that describe these ranges are combined into safeguards and are monitored by sensors, which in the terminology of the present invention are considered to be among the robots or automatic agents. If the plant status violates one or more safeguards, then human operators must immediately switch over to the safeguard-oriented procedure, or in other words they must initiate activities referred to the plant status, until the safeguards are again reached. The activities of the human operators are limited in this case to the triggering of certain activities, while many monitoring and control activities are executed in parallel by the automatic agents or robots.

According to the invention, it is possible to integrate the event-oriented and the safeguard-oriented procedures, which are equivalent to the state of the art of the present applicant in the form of an operational handbook and are described in conjunction with FIGS. 2 and 3. This is done by inputting the relevant sensor data, which are available on-line, into the log 6 shown in FIG. 1 through robots. The memorized execution and optionally background information 9', 10' thereby encompass the contents of a high-quality operational handbook of the task, which are demarcated by the specifications of the activities, of the robots 3 and the human operators 2', or in other words are interlinked with the entire management system. In this way, with the method according to the invention, even complex plants can be controlled, monitored and regulated directly.

In order to comprehend the method according to the invention, reference will first be made to FIG. 4. One possibility for describing the course of the task (activities of the robots 3 and human operators 2') will be formed in accordance with this method. To that end, a description language for complex tasks has been created. Any knowledge about the current situation is taken by the system from the log 6, which represents a list of events in FIG. 4, and is ordered in accordance with the notation times. Each event has the following entries: a time 21 at which the event was noted in the log; a period of time 22 in which the event occurred; an agent 23 which or who triggered the action and caused the event to be noted down; an activity 24 to which the action belongs; a phase 25 during which the execution of the activity occurred and which reproduces the type of action; a plant parameter 26 about which the activity has gained some recognition; a status of the parameter 27 that was discovered by the action; and comments 28 that the agent may have made with respect to triggering the action.

FIG. 5 shows two conditions 29, 30 that are linked together so as to make an inference. The linking time means "or", and both conditions describe an event type, such as "styp 12" Each of the two conditions 29, 30 also describes the type of an event. If an event which is equivalent to that type is found in the current situation, then the condition calls the corresponding situation positive. A respective condition 29, 30, includes two sets of predicates 31, 31a and 32, 34, respectively, relating to events. For instance, the predicate 31 can assess whether an event notes down an action for an activity from the set 31' of predetermined activities; whether in this action a recognition 31a was obtained from a set of predetermined parameters; or whether the period of time in which the action occurred was located within a predetermined time interval. Such a time interval, which is also known as a time slot, is enclosed in square brackets and for the predicate 32 it means, for instance, that a "scram" must have occurred at the beginning of the interval and that 600 seconds must have elapsed after the "scram". In the case of the predicate 34, "[30, 50]" stands for a coolant pressure range. Reference numeral 33 indicates a symbol Ω for an isolation step, which will be described in further detail in conjunction with FIG. 5. RESA means a reactor scram.

A situation type according to FIG. 5 connects a set of conditions, by means of inferential linkages, into a formula that describes the type of a situation. Since reference can be made simultaneously to activities and to plant parameters even within conditions, the integrated and flexible situation reference is assured.

As is seen in FIGS. 6 and 7, one element in the makeup of activities is sequence descriptions 40. Each of these includes a list of situation types. Each element in the list describes the type of a situation in which a phase transition 36 to a new execution phase 35 of the activity can take place, as is shown in FIG. 6. The triggering of an action for the activity is equivalent to the transition 36 to a new phase: in this way, the situation-dictated initiation, termination, discontinuance, etc. of an activity can be described. An activity is aware of the following execution phases: "not done" 35a, "started" 35b, "recognized" 35c, "done" 35d, "compensated for" 35e and "discontinued" 35f, and can execute phase transitions 36 along the arrows shown in FIG. 6. While actions in all phases enter information regarding the execution of the task as a result of corresponding events into the log 6 in FIG. 1, a "recognized" event supplements the log by one additional description of the current status of a plant parameter 39 as obtained as a result of the activity. Activities also include a set of descriptions of their execution 41 in different languages of agents. Such languages may be German, English, etc. for human operators, and for robots they may be formal languages that they can execute, or in other words as a rule programming languages. If an agent indicates the language that he, she or it understands, then he, she or it is automatically offered the information which is understandable to him, her or it. In addition, each activity is part of the detailed hierarchy of the overall task. Each activity has a more-complex activity 37 and a set of more-detailed activities 38. The overall task is at the top of the hierarchy and primitive activities which are not detailed further are located at the lower ends of the hierarchy.

Figure 8:
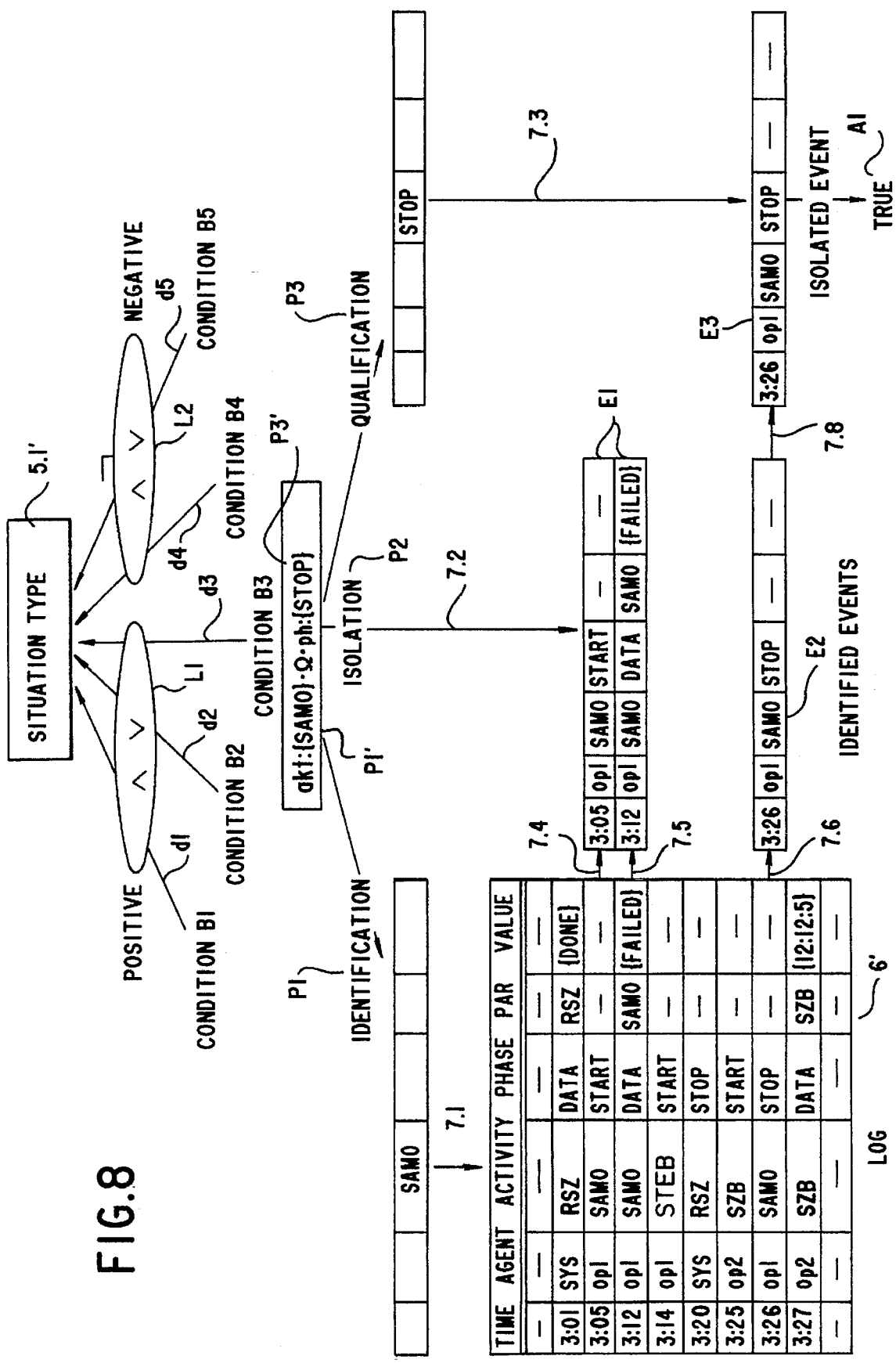
FIG. 8 is a diagram showing how a situation type is broken down into individual conditions that are logically linked with one another and showing how a condition is compared with a situation that is predetermined by the log or with the individual events of the log and its match with the predeterminations formulated by the condition is checked, so that a statement "true" or "false" is the result.

The way in which the comparison unit 7 of FIG. 1 functions will be explained below in basic terms, while referring to FIG. 8 in conjunction with FIG. 5. The diagram of FIG. 8 shows a comparison algorithm. The inferential linkage of a series of conditions B1–B5, specifically positive conditions B1–B3 and negative conditions B4, B5, results in a certain situation type 5.1', which is contained as data contents in the data memory 5 shown in FIG. 1. Reference symbol L1 represents logical (AND/OR) linkages between the conditions B1–B3; and reference symbol L2 stands for logical (AND/OR) linkages between the conditions B4, B5. Arrows for the logical linkages B1–B5 are numbered d1–d5. Reference symbol P1 symbolizes an identification step for the condition B3, which is addressed in further detail in the drawing, while reference symbol P2 represents an isolation step and reference symbol P3 represents a qualification step. In the condition B3, an activity "SAMO" (which stands for safeguard monitoring) is contained in the form of a set predicate, and a phase "stop" is contained as another predicate of one set. The two predicates, one pertaining to an activity and the other to an execution phase, are indicated by reference symbols P1' and P3'. Reference symbol P1' accordingly represents the identification portion of a condition, which is comparable to the identification portion 32 of FIG. 5. Through the use of the comparison unit 7, with a predicate P1' listed in the identification part of the condition B3, which predicate defines one type of event, the events corresponding to the event type are filtered out of the log 6, as is represented by an arrow 7.1. Among events E1 which are identified (see indicating arrows 7.4 and 7.5 for a stepwise execution), the most recent event is isolated, as is illustrated by the Ω sign in the condition B3 and an arrow 7.2. This results in an identified, isolated event E2, which was sought in the log 6 (see indicating arrow 7.6). This identified and isolated event E2 is then checked, in a qualification step P3, with the predicate listed in the qualification part P3' of the condition B3, as to whether or not it matches the thus-defined event type. If so, the condition is marked as "correct" or "true", as is seen by a statement A1 about the matching of condition and log (ascertained situation type).

In summary, the result is that the comparison unit with the predicates listed in the identification part 32 of FIG. 5 or P1' of FIG. 8, of a respective condition 30 or B3, filters out of the log 6 all of the events E1 that are assessed positively by the predicate. Next, following an arrow 7.2, it is seen that from the filtered-out events El, the comparison unit isolates the most recent event E2 that has occurred and sends it to the predicate P3' of the qualification part or step P3 for assessment. If the isolated event also passes this qualification test, then the situation represented by the log 6 is assessed positively (A1) by the condition being examined. If after evaluation of the individual conditions B1–B5 and insertion of the results, the formula of a situation type 5.1' has the overall outcome of a positive assessment, then the current situation matches the description of the situation type. Since situation types in sequence descriptions 40 of activities shown in FIG. 7 describe situations in which actions are triggered, if such a situation type is assessed positively, the corresponding action can be marked as potentially triggerable.

Figure 10:
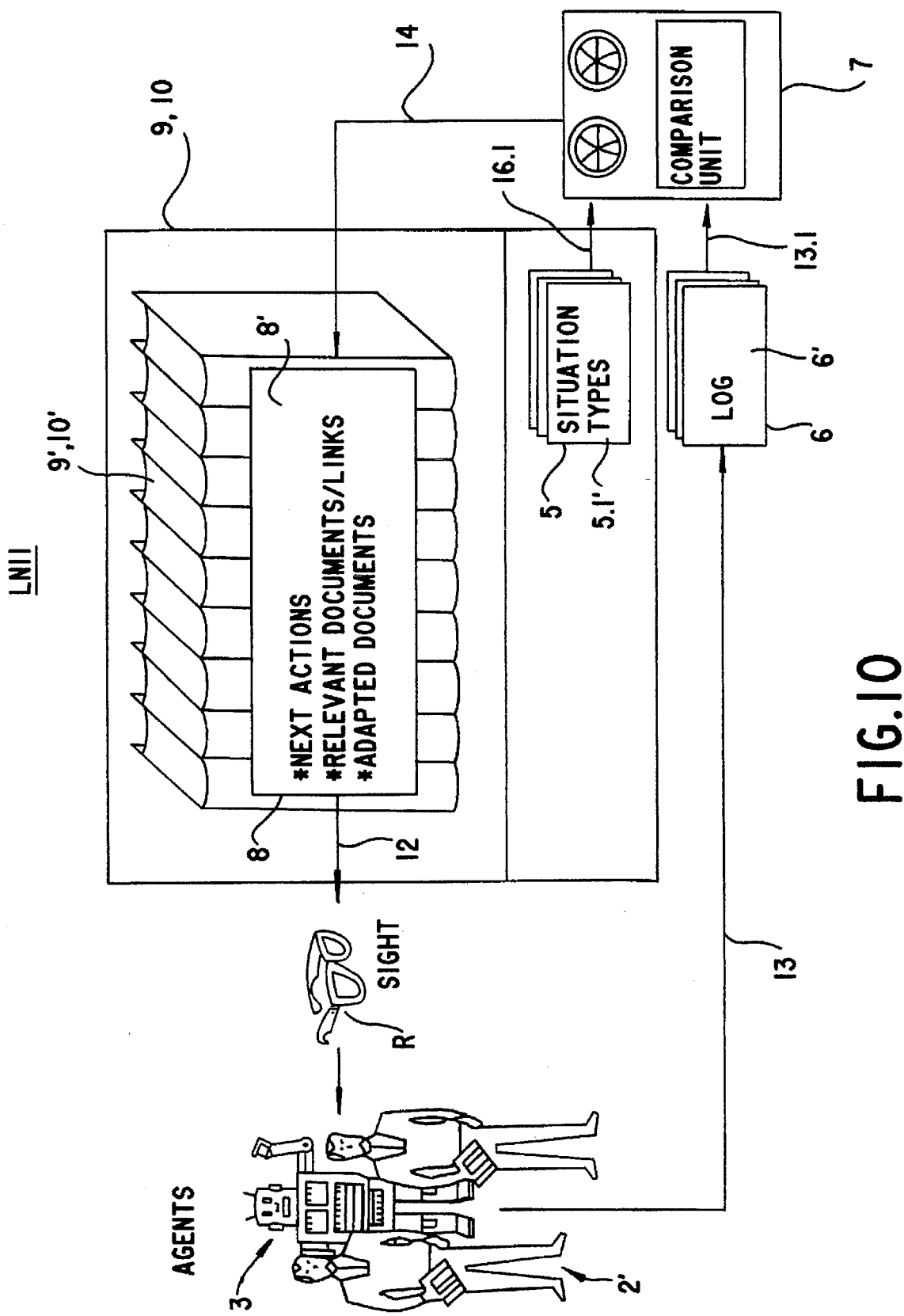
FIG. 10 is a diagram containing the architecture of FIG. 9 in compact form and showing a central mode of operation of the management system of FIG. 1, in which a cycle entitled "event —log—comparison with situation types— action possibility" is illustrated.

FIG. 10 shows a cycle which begins, for instance, at the triggering of an action by human operators 2' or robots 3 ("agents"), the entry of this action as an event in the log 6, the comparison of situation types 5.1' with the newly arisen situation 6' in the comparison unit 7, and the output of action possibilities 8' to the agents 2', 3. Elements which are identical to those in FIG. 1 are provided with the same reference numerals in FIG. 10 as well. This involves a management network LN11 as part of the system LS of FIG. 1. The coordination of the agents 2', 3 takes place in an activity-oriented manner. The agents agree as to who or what will execute which activities, by giving one another mutual orders and either accepting or refusing them. An order includes a set of activities and if it is accepted obligates the agent tasked with it to carry it out. Automatic agents 3 are preferably programmed in such a way that they can refuse an order, but only in the rarest cases (they can refuse only orders that would be contradictory or would conjure up danger). The agent 2', 3 that are tasked with the order should trigger actions for the activities assigned, until there are no longer any action possibilities, and the activity has changed to a neutral execution phase ("not done", "done", "compensated for", "discontinued"). At the same time, a communications connection is built up by means of the employer-employee relationship between the agents 2', 3. Actions that the employee triggers for the activities of the job are automatically reported to the employer.

Figure 9:
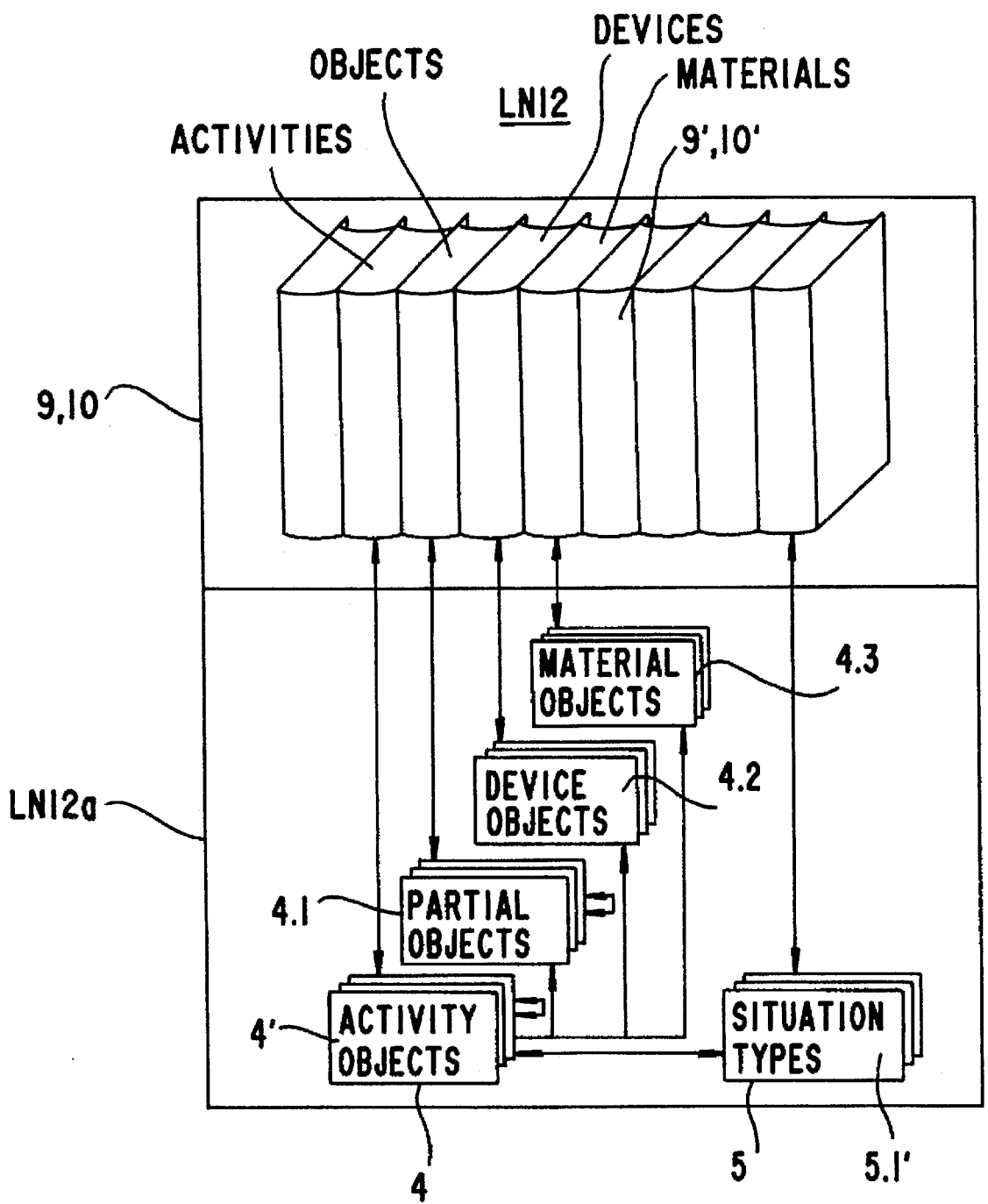
FIG. 9 is a diagram showing an architecture of the management system of FIG. 1, including an informal and a formal layer.

FIG. 10 also shows that the contents 9', 10' of the two data memories 9 and 10 (also see FIG. 1), or in other words the so-called expert book, and the contents 8' of the data memory 8 for action possibilities, can be combined to make a statement about the next actions to take, about relevant documents and cross references (links), and about adapted documents. In the case of the human operators 2' and robots, all of these statements can be limited to what is essential for them by means of a so-called sight, which is symbolized by the dark glasses R. A "sight" is based, for instance, on the indication of a set of activities, which can be formulated either explicitly or implicitly, in the latter case, for instance, through the relevant parts of the plant at which the activities sought are supposed to occur. FIG. 9 shows a management subnetwork LN12, including the data memories 9 and 10 that are shown as being combined in this case and have contents which encompass a so-called informal layer 9', 10' of the operational handbook, which in this case, however, is broken down into further categories, specifically to match a finer breakdown of a network part LN12a. In addition to the data memory 5 for sequence descriptions or situation types, the network part LN12a also contains the data memory 4 for activities and other additional data memories 4.1–4.3, which in addition to the "activities" content of the fourth data memory 4 also contain the specifications for "objects", "devices" and "materials". These terms have the following meanings: "objects" are formal specifications of parts of the plant at which activities occur; "devices" are formal specifications for devices which are necessary for the execution of activities; and "materials" are formal specifications of materials to be used during the execution of activities. All of these specifications, which are assigned reference numerals 4' and 4.1–4.3, are coupled over suitable data lines, which are not identified by reference numerals, to the data memory 4 or its contents 4', to the correspondingly broken-down informal layer 9', 10' of the data memories 9, 10 and to the data memory 5 for situation types or sequence descriptions.

Now that the makeup and structure of the sequence descriptions, the log, the comparison unit and the information have been described, the mode of operation of the management system LS and the method of the invention for gaining control over a reactor failure mode, in other words controlling, monitoring and regulating a reactor failure mode, can be discussed. The coordination among human operators 2' and robots 3 is usually performed in such a way that the human operators are the employers and the robots are the employees. This is the purpose for the system of FIG. 1, which keeps in readiness all of the execution information 9' and other supplementary information 10' (see also FIG. 9) for failure mode handling for both robots and human operators and also keeps in readiness a comprehensive description 4', 5' of the course of the task for handling failure modes, in the form of sequence descriptions 5' of activities (see also FIG. 9). The task description includes several detail levels. Agents (typically robots) 2', 3, as part of the task, constantly carry out activities 11' (arrows drawn with dashed lines in FIG. 1), which monitor plant parameters as to whether or not a failure mode is ensuing, and enter information regarding the current parameter values along with "recognized" events in the log 6. Each time an event has been noted in the log, the comparison unit 7 then examines whether or not a situation has arisen that is described by any situation types 5.1' (FIG. 8) and would as a result open up any action possibilities 8', 14 (also see FIG. 10). As soon as a failure mode arises, the current parameter values change in a characteristic way that is described by situation types of sequence descriptions, and the comparison unit 7 can tell the agents 2', 3 what the first action possibilities 8' for failure mode handling are, over the signal line 14. Typically, actions for activities that human operators 2' allocate to the robots 3 for the sake of a fast reaction are triggered and entered as events in the log 6. The control instructions for executing the activities are received by the robots 3 from the corresponding execution information 9'. The human operators 2' automatically receive reports about the actions that are triggered in the execution of these activities by the robots 3, and can accordingly monitor the correct course of automatic steps being taken (see FIG. 10, "sight" R). After some time, the human operators 2' make an active intervention into the regulation of the reactor 1, in order to convert it into a long-term safe state. They take over certain activities 4' into their area of responsibility, or task one another accordingly, and trigger actions on the basis of action possibilities 8' offered to them. They receive information on their execution automatically and can also be supplied with other information 10', which is stored in the data memory 10 and linked by the line 15 with the execution information 9'. In principle, they are not compelled to trigger only actions and then note down only events that the system proposes to the agents 2', 3. If the plant status should require this, then an agent 2', 3 can at any time act independently of the proposals of the system LS. The actions that he, she or it adds in the form of events to the log 6 change the described situation and enable the system, as soon as the situation corresponds to one of the situation types associated with the activities, to again propose situation-oriented action possibilities 8'. Moreover, depending on qualification, importance, etc., human operators 2' can execute the task in variously detailed ways, or in other words can trigger actions for activities at various detail levels. Furthermore, at any time they can task suitable robots 3 with routine activities, such as monitoring or regulating parameters. More-complicated activities could, for instance, also be allocated to expert systems. Care must be taken to assure that the course of the overall task for failure mode handling, including automatic, event-oriented and safeguard-oriented activities, is described in the management system (see FIGS. 2 and 3). The activities can be allotted flexibly to the agents 2', 3 for execution, and the human operators 2' can also be relieved from some parts of the task by robots 3'. This is described in more detail above as one of the modes of the invention.

Figure 11:
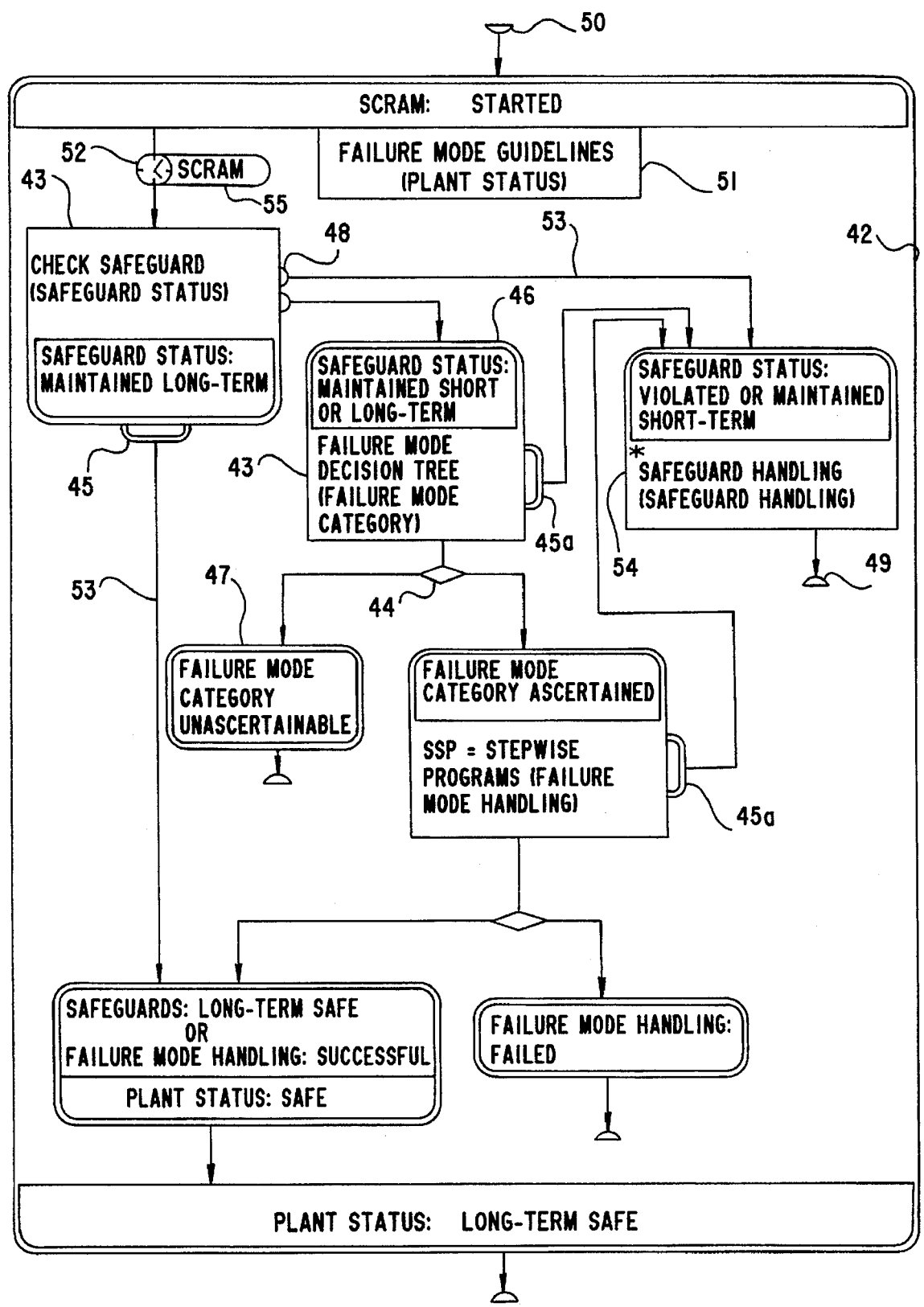
FIG. 11 is an exemplary embodiment of an action diagram that can appear on the screen of equipment for the information for the human operators.

In order for the strategic overview over the entire situation to be imparted to the human operators 2', beyond the tactical sight of the possible actions in one situation, suitable illustration means have been discovered, which can reproduce the course of the task in a clearly understood way. This is done by means of a graphic presentation, using action diagrams, as is shown in FIG. 8. The formulation of activities and situation types forms the nucleus of the definition of action diagrams. Activities are presented graphically as rectangles 42, 43 in FIG. 11. The text written into them explains the goal of the execution of the activity and, as needed, indicates the plant parameter about which the activity gains knowledge, in cursive. If the box is entered through the upper horizontal line, this can be interpreted as the beginning of the activity. Analogously, the activity is done, i.e., completed, when one leaves the rectangle by way of the lower horizontal line. If one leaves the rectangle through one of the vertical lines, then a new handling track begins during the processing of the activity. Whether the activity that has been left was discontinued then or continues onward unaffected must be described by additional graphic means (see below). The hierarchical detailing of activities is effected simply by the fact that an arbitrary action diagram can be assembled within one activity box 42, which is a large rectangle for a complex activity. In this case, an abbreviation 51 of the activity goal for the activity box 42 is shifted to the upper edge of the small box and is shaded in gray. A second possibility is to refer with an asterisk 54 to the existence of a new or specific action diagram. A rectangle 47 with a double line around the edge and rounded corners is used as a graphic symbol for situation types. Situation type boxes 47 describe situations that should have arisen if one wants to go past them in order to continue the task course. Text is placed in the situation type boxes in order to describe the situation. Plant parameters that appear in the text are written in cursive. There are no other formal requirements for the contents of the situation box. The connection of situations and activities in order to formulate the situation-dictated triggering or ending of activities is performed on the basis of the graphic connection of the two symbols 43, 47. Situation types for the beginning of an activity are integrated at the upper end, and situation types for the completion at the lower end, of an activity box 43.

However, the attempt to provide an overview as to the nature of the task course requires more than these constructs. Connections must be made between activity and situation boxes, in order to make their typical succession visible to the operator. It is not until then that the task description, by means of action diagrams, acquires a "face". For the connections, arrows 53 are chosen, in other words lines with an arrowhead at one end. The arrowhead indicates the direction of the task course. Once an arrow has appeared at its base, then one can follow it as far as its arrowhead without further consequences. The base of the arrow can accordingly logically be placed on situation boxes and at the lower or side edge of an action box. Arrowheads point to situation boxes 47 or to the top edge of action boxes 43. Since new handling tracks can be added or subtracted constantly, action diagrams also require symbols for producing handling tracks 50 "from nothing" as it were and consuming such sequences 49 "down to nothing". "Nothing" points 50 and 49 serve this purpose. They are symbolically represented by black semicircles, at which new handling tracks can readily be begun or ended. A black semicircle 50 with an arrow pointing away from it means that at this point a new handling track can be begun at any time. A black semicircle 49 with an arrow pointing to it indicates that when one has arrived at that point, the processing of this handling track stops. The third possible way of using "nothing" points is afforded by the sides of activity boxes 43. If one leaves the box through a nothing point 48 at the base of an arrow 53, then the processing of the activity that has been left continues, and a new handling track begins parallel to it. Conversely, if there is no "nothing" point present, then the processing of the activity that has been left must be discontinued.

Further symbols are necessary in order to work with handling tracks that are taking place in parallel. However, no symbol is needed for triggering parallel handling tracks: an arbitrary number of arrows is simply extended from the desired point (usually at the lower edge of an activity box or situation type box). In order to describe the triggering of alternative handling tracks from one point, action diagrams use a small diamond 44. A handling track that enters the top point of the diamond with an arrow divides into alternative tracks, with arrows extending from the other points of the diamond, or if needed from the lower edges. The construction is analogous when handling tracks are combined. Simply combining handling tracks is accomplished by simply making the corresponding handling tracks converge at the desired point (usually at the upper edge of an activity box or situation type box). Once a handling track arrives at that point, it can immediately be continued there. The synchronized combining of handling tracks is indicated by a non-illustrated equilateral triangle standing on one corner. The handling track emerging from the bottom corner of the triangle can be entered, in the sense of an AND condition, only if all of the handling tracks that have entered the base of the triangle, located at the top, have arrived. The symbol for the formulation of timewise aspects of the task course completes the definition of action diagrams: an analog dial 52. This symbol has a dual purpose. Firstly, it serves to define times, that is when one passes this symbol, then the time shown has occurred. Secondly, when it is associated with situation type boxes, it makes it possible to install time gates in handling tracks that can be passed only at the times which are named. In order to define a time, a small rectangle 55 with rounded corners is placed at the right-hand edge of the dial. The name of the time is written in the rectangle 55. In order to describe a time gate, the symbol is placed on the upper edge of a situation type box 47.

It is possible, in order to leave an activity, for a situation type to play a role that is already listed at the point where the task course should already continue. In order to avoid duplication, "with-reservations symbols" or place-holding symbols 55 for situation types may be placed at the lower edge (when the activity is done) or such symbols 45a may be placed at the right-hand edge (when the activity is discontinued). The effect of these symbols 45, 45a is as though the situation types, with which they are connected through an arrow, had taken their place. The activity can be left through a "place-holding symbol" only if the situation type which is thus "linked" also classifies the current situation.

The invention is not limited to the exemplary embodiment shown and described of the method and the associated management system according to the invention. On the contrary, it is highly advantageously usable:

with the use of digital computation programs (simulators) that simulate a complex industrial process; and in training the operating staff (including during off-line operation).

We claim:

1. A method for controlling, monitoring and regulating processes in industrial plants, which comprises the steps of:
   a) interacting at least one of robots provided as a computation program and human operators, with sensors and actuators being coupled to a process and procuring process information for influencing the process;
   b) collecting information about how values of process parameters are developed and what actions are triggered by the robots and the human operators in a log, by recording both a history of plant performance and an action history in the log;
   c) making up the log from events being created by noting down actions;
   d) logically interlinking sets of conditions each pointing to a presence of one type of event in the log or defining such a type of event, by means of the situation types contained in sequence descriptions;
   e) checking for the presence of an event type described by each condition of a situation type in the log, and using the logical linkages of the conditions to automatically make statements as to the possibility of corresponding actions in the current situation predetermined by the log, with the comparison unit;
   f) supplying a set of specifications of activities:
   f1) indicating what actions in what types of situations can be triggered, for referring the types both to the process history and the action history, and
   f2) each specification containing one set of references to information on executing the actions being directed to at least one of the robots and the human operators; and
   g) linking supplementary background information to execution information in such a way that at least one of the robots and the human operators reaches the background information while taking the execution information as a point of departure, and
   h) comparing the types of situations with a current situation indicated by the applicable log, ascertaining if the current situation corresponds to a type of situation, and deriving action possibilities therefrom, in a comparison unit.

2. The method according to claim 1, which further comprises the steps of controlling, monitoring and regulating complex plant management processes in failure mode situations in a nuclear power plant.

3. The method according to claim 1, which further comprises the steps of:
   a) making up the log from events being created by noting down actions;
   b) logically interlinking sets of conditions each pointing to a presence of one type of event in the log or defining such a type of event, by means of the situation types contained in sequence descriptions;
   c) checking for the presence of an event type described by each condition of a situation type in the log, and using the logical linkages of the conditions to automatically make statements as to the possibility of corresponding actions in the current situation predetermined by the log, with the comparison unit; and
   d) linking supplementary background information to execution information in such a way that at least one of the robots and the human operators reaches the background information while taking the execution information as a point of departure.

4. The method according to claim 1, which further comprises a step of representing information for the human operators about the action possibilities ascertained by the comparison unit in a predetermined current situation with the aid of action diagrams graphically describing a course of a task.

5. The method according to claim 1, which further comprises the step of making up the log with a list of events being ordered in accordance with notation times.

6. The method according to claim 5, which further comprises the step of providing each event with the following entries: a time at which the event was noted in the log; a time period during which the event took place; an agent being at least one of a human operator and a robot having triggered an action and caused the event to be noted; an activity to which the action belongs; a phase in which the execution of the activity occurred and which records the type of action; plant parameters about which the activity has optionally become aware; and a value of the parameter being found by the action.

7. The method according to claim 6, which further comprises the step of providing each event with an entry containing comments that at least one of the human operator and the robot made for triggering the action.

8. The method according to claim 5, which further comprises the steps of defining the applicable situation type by a set of conditions being linked together inferentially, providing each of the conditions with an identification part and a qualification part, and providing each part with a set of predicates each defining one type of event.

9. The method according to claim 8, which further comprises the steps of filtering the events corresponding to the event type out of the log by means of the comparison unit with the predicates listed in the identification part of a condition and the predicates defining a type of event; isolating the chronologically most recent of the events; and checking the isolated event along with the predicates listed in the qualification part of the condition as to whether or not it meets the thereby-defined event type, if so marking the condition as "correct", and if not marking the condition as "incorrect".

10. The method according to claim 1, which further comprises the step of associating an activity with the following execution phases: "not done" , "begun", "recognized" and "completed" or "compensated for" or "discontinued", designating the situations in which the transitions can occur between the phases as follows: "not done" $\longrightarrow$ begun, detected $\longrightarrow$ completed and begun or detected $\longrightarrow$ discontinued, by situation types, and appending the situation types being bundled into a sequence description, to a specification of the activity.

11. The method according to claim 10, which further comprises the steps of entering the actions at transitions between the execution phases into the log and entering a "recognized" event into the log with a description of the current status of the current value of a plant parameter as obtained by means of the activity.

12. The method according to claim 1, which further comprises the step of indicating at least one of a more-complex activity and a set of detail activities in a specification of an activity.

13. A method for controlling, monitoring and regulating processes in industrial plants, which comprises the steps of managing processes of a power plant, by:
   a) interacting at least one of robots provided as a computation program and human operators, with sensors and actuators being coupled to a process and procuring process information for influencing the process;
   b) collecting information about how values of process parameters are developed and what actions are triggered by the robots and the human operators in a log, by recording both a history of plant performance and an action history in the log, entering relevant sensor data being available on-line about robots, into the log; and encompassing contents of a high-quality operational handbook for the task of the robots and human operators being demarcated by specifications of the activities, with memorized execution and possibly background information,
   c) supplying a set of specifications of activities:
   c1) indicating what actions in what types of situations can be triggered, for referring the types both to the process history and the action history, and
   c2) each specification containing one set of references to information on executing the actions being directed to at least one of the robots and the human operators; and
   d) comparing the types of situations with a current situation indicated by the applicable log, ascertaining if the current situation corresponds to a type of situation, and deriving action possibilities therefrom, in a comparison unit.

14. The method according to claim 13, which further comprises the step of managing processes of a nuclear power plant with steps a and b.

15. A method for controlling, monitoring and regulating processes in industrial plants, which comprises the steps of:
   a) interacting at least one of robots provided as a computation program and human operators, with sensors and actuators being coupled to a process and procuring process information for influencing the process;
   b) collecting information about how values of process parameters are developed and what actions are triggered by the robots and the human operators in a log, by recording both a history of plant performance and an action history in the log;
   c) coordinating each robot through a data line and coordinating each of the involved human operators through a work station with another of the at least one of the robots and human operators, for the execution of a task by a plurality of at least one of the robots and human operators, by entering indications about actions they trigger into the common log or calling up memorized information, for making the at least one of the human operators and robots mutually aware of particular action possibilities being relevant to them,
   d) supplying a set of specifications of activities:
   d1) indicating what actions in what types of situations can be triggered, for referring the types both to the process history and the action history, and
   d2) each specification containing one set of references to information on executing the actions being directed to at least one of the robots and the human operators; and
   e) comparing the types of situations with a current situation indicated by the applicable log, ascertaining if the current situation corresponds to a type of situation, and deriving action possibilities therefrom, in a comparison unit.

16. A method for controlling, monitoring and regulating processes in industrial plants, which comprises the steps of:
   a) interacting at least one of robots provided as a computation program and human operators, with sensors and actuators being coupled to a process and procuring process information for influencing the process;
   b) collecting information about how values of process parameters are developed and what actions are triggered by the robots and the human operators in a log, by recording both a history of plant performance and an action history in the log;
   c) supplying a set of specifications of activities:
   c1) representing activities of a so-called "event-oriented" kind of procedure, for reproducing a task sequence essentially on the action history, with a flow chart, and
   c2) representing activities of a so-called "protection goal-oriented" kind of procedure, for reproducing a task sequence supported essentially on the plant history by means of a table linking plant statuses and respective activities being suitable as a reaction to them;
   c3) indicating what actions in what types of situations can be triggered, for referring the types both to the process history and the action,
   c4) modeling the "event-oriented" or "safeguard-oriented" task sequence with the sequence descriptions associated with the specifications of the activities;
   c5) supplying execution information associated with the specifications of the activities or background information linked therewith with contents of so-called "event-oriented" or "safeguard-oriented" operational handbooks and making it accessible off-line to a human operator for information search purposes;
   c6) each specification containing one set of references to information on executing the actions being directed to at least one of the robots and the human operators; and
   d) comparing the types of situations with a current situation indicated by the applicable log, ascertaining if the current situation corresponds to a type of situation, and deriving action possibilities therefrom, in a comparison unit.

17. The method according to claim 16, which further comprises the step of supplying the execution information or background information with the contents of so-called "event-oriented" or "safe-guard-oriented" operational handbooks for nuclear power plants.

18. A management system with a display device, for controlling, monitoring and regulating processes in industrial plants, comprising:
   a) at least one digital computer having a computation program forming robots;
   b) sensors and actuators interacting with said robots, being coupled to an industrial plant process and procuring process information or influencing the process;
   c) an input/output unit for human operators;
   d) a comparison unit;
   e) a data line connected to said comparison unit;

f) a log module having a first data memory with an input side being connected to said robot for data entry and being connected to said input/output unit for human operators, said log module having an output side connected through said data line to said comparison unit, said log module collecting information about how values of process parameters develop and what actions are triggered by said robots and the human operators and logging a history of process performance and an action history;

g) a second data memory for sequence descriptions or situation types having an output side connected to said comparison unit, for storing a set of specifications in memory, the specifications each containing a sequence description defining what actions can be triggered in what types of situations; and h) said comparison unit having means for comparing the situation types from said second data memory with a current situation logged by said log module, for comparing the types with both the history of the process performance and the action history of said robots and the human operators, for permitting a determination as to if the current situation matches one of the situation types, and for deriving action possibilities therefrom.

19. The system according to claim 18, wherein said sensors and actuators are coupled to complex industrial nuclear power plant processes in failure mode situations and procure information for influencing those processes.

20. The system according to claim 18, including a third data memory communicating with said robots and with said input unit for the human operators, said third data memory containing a set of information for carrying out activities to be selected by the human operators and said robots through references and to be shown on viewing devices of a display device for the human operators and being available through a data line for said robots.

21. The system according to claim 20, including a fourth data memory for activities to be executed dependent on the type of situation, said fourth data memory communicating with or being integrated with said second data memory for sequence descriptions.

22. The system according to claim 21, including a data memory having explanatory information, said fourth data memory having an "activities" content including specifications of "activities", as well as "partial objects", "device objects" and "material objects", wherein the "partial objects" represent formal specifications of parts of the plant, the "device objects" represent formal specifications of devices required for executing activities, and the "material objects" represent formal specifications of materials to be used during the execution of activities, being coupled with the explanatory information in said data memory.

23. The system according to claim 22, wherein said data memory having explanatory information is a fifth data memory for supplementary information, said fifth data memory communicating with said third data memory for the execution information.

24. The system according to claim 23, including a sixth data memory for action possibilities, and an output data line of said comparison unit through which said sixth data memory communicates with said comparison unit, for showing the action possibilities contemplated for the human operators and said robots on a screen or calling up the action possibilities through a data line.

25. The system according to claim 23, including a sixth data memory for action possibilities, and an output data line of said comparison unit through which said sixth data memory is integrated with said comparison unit, for showing the action possibilities contemplated for the human operators and said robots on a screen or calling up the action possibilities through a data line.

* * * * *